(12) United States Patent
Chen et al.

(10) Patent No.: US 11,496,039 B2
(45) Date of Patent: Nov. 8, 2022

(54) POWER CONTROLLER AND CONTROL METHOD FOR LLC RESONANT CONVERTER

(71) Applicant: Leadtrend Technology Corporation, Zhubei (TW)

(72) Inventors: Yao-Tsung Chen, Zhubei (TW); Kuan-Hsien Chou, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 172 days.

(21) Appl. No.: 17/106,756

(22) Filed: Nov. 30, 2020

(65) Prior Publication Data

US 2021/0305888 A1  Sep. 30, 2021

(30) Foreign Application Priority Data

Mar. 30, 2020  (TW) .................................. 109110852

(51) Int. Cl.
*H02M 1/08* (2006.01)
*H02M 3/335* (2006.01)
*H02M 1/00* (2006.01)

(52) U.S. Cl.
CPC ......... *H02M 1/08* (2013.01); *H02M 3/33569* (2013.01); *H02M 1/0035* (2021.05); *H02M 1/0054* (2021.05)

(58) Field of Classification Search
CPC .. H02M 1/08; H02M 3/33569; H02M 1/0035; H02M 1/0054; H02M 3/01
See application file for complete search history.

(56) References Cited

U.S. PATENT DOCUMENTS

| | | | |
|---|---|---|---|
| 7,251,146 B2* | 7/2007 | Aso | H02M 3/33571 363/21.04 |
| 11,095,207 B1* | 8/2021 | Yau | H02M 3/157 |
| 2020/0336062 A1* | 10/2020 | Chen | H02M 1/096 |
| 2021/0305888 A1* | 9/2021 | Chen | H02M 1/08 |
| 2021/0376714 A1* | 12/2021 | Tsou | H02M 1/4233 |

* cited by examiner

*Primary Examiner* — Kyle J Moody
(74) *Attorney, Agent, or Firm* — McClure, Qualey & Rodack, LLP

(57) ABSTRACT

A power controller for an LLC resonant converter controls a high-side switch and a low-side switch. An ON-time generator in the power controller determines a high-side ON time of the high-side switch and a low-side ON time of the low-side switch in response to the bigger one between a feedback voltage and a burst voltage, where the feedback voltage is generated in response to an output voltage of the LLC resonant converter. A burst-mode controller in the power controller has a triangular-wave generator providing a triangular-wave signal with an amplitude in association with the burst voltage. A comparator comparing the triangular-wave signal and the feedback voltage to determine a break time when both the high-side and low-side switches are turned OFF. The LLC resonant converter operates in a burst mode when the break time is introduced.

20 Claims, 4 Drawing Sheets

POWER CONTROLLER AND CONTROL METHOD FOR LLC RESONANT CONVERTER

CROSS-REFERENCE TO RELATED APPLICATION

This application claims priority to and the benefit of Taiwan Application Series Number 109110852 filed on Mar. 30, 2020, which is incorporated by reference in its entirety.

BACKGROUND

The present disclosure relates generally to LLC resonant converters, and more particularly to burst-mode operation controls in LLC resonant converters that increase power conversion efficiency for light or no loads.

LLC resonant converters are very superior in conversion efficiency among switching mode power converters. As known in the art, conduction losses of power switches, the power losses when power switches conduct current, are some major causes of the power losses in a switching mode power converter. Theoretically, an LLC resonant converter can operate its two main power switches, high-side and low-side switches, to perform zero voltage switching (ZVS), a technology that a power switch is turned ON around the moment when the voltage drop across the conduction channel of the power switch is about zero. The conduction losses caused by the conductions of high-side and low-side switches could be therefore minimized. LLC resonant converters are mostly used for high power applications, for example, converting power more than 100 W.

An LLC resonant converter suffers, however, in significant switching losses when it provides power to a light load or no load. As known in the art, the switching frequency of an LLC resonant converter increases when its load decreases. Even though the conduction losses of an LLC resonant converter could be suppressed or minimized by ZVS, switching losses, the power losses needed to charge or discharge control nodes of power switches, inevitably increase along with the increment of switching frequency. The significant increment in the switching frequency of an LLC resonant converter could cause significant switching losses that seriously degrade the power conversion rate of the LLC resonant converter. Accordingly, it is often needed to provide specially operations when the load of an LLC resonant converter is light or non-existent.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

According to embodiments of the invention, an LLC resonant converter operates in a burst mode when its load is light or non-existent. When operating in a burst mode, break time BRK, when high-side and low-side switches constantly turn OFF, alternates with work time WK, when high-side and low-side switches switch periodically and complementarily. The combination of a period of bread time BRK and a period of work time WK forms a predetermined burst cycle time TBST, which according to one embodiment of the invention is a constant independent from the load of an LLC resonant converter.

Figure 1:
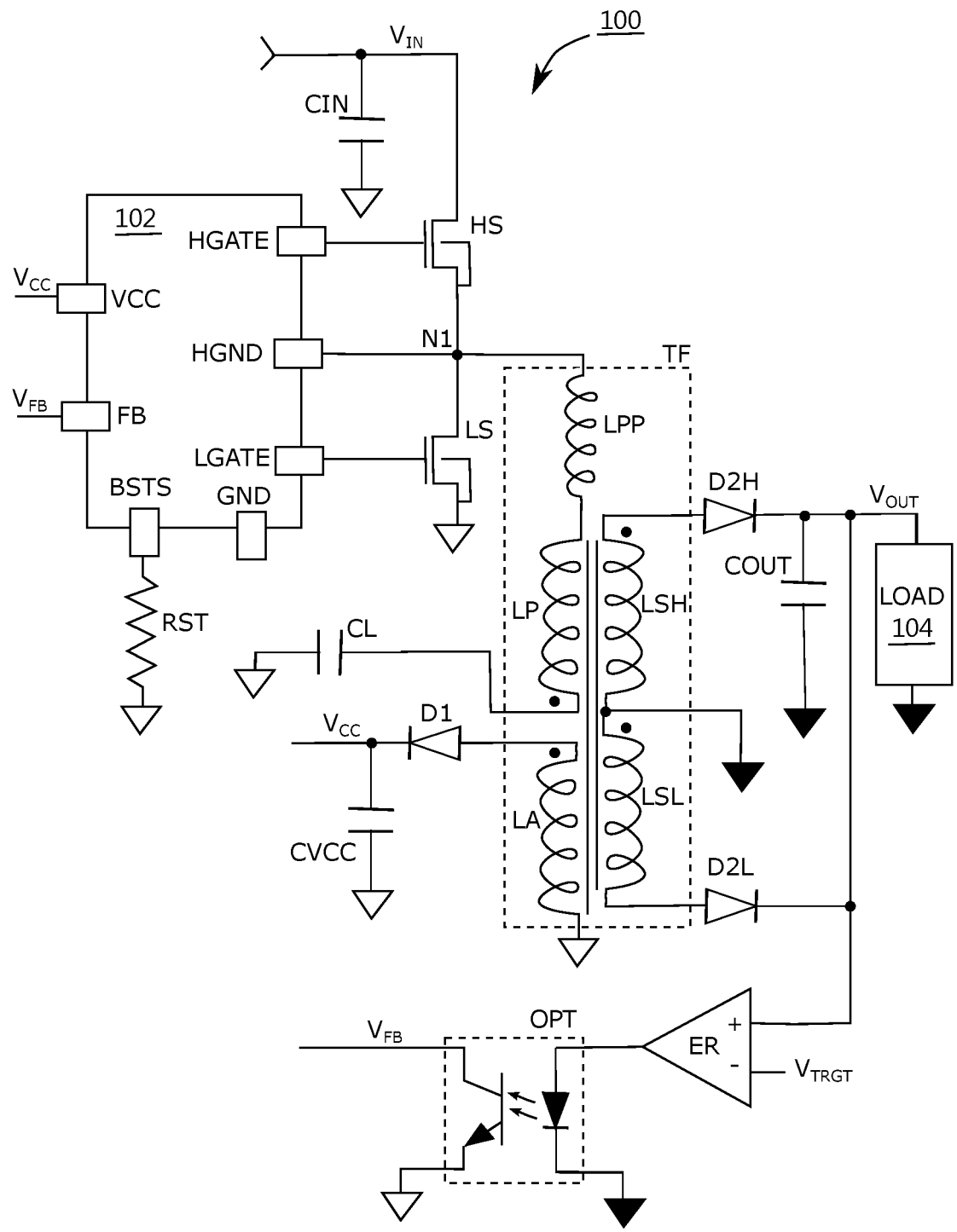
FIG. 1 demonstrates LLC resonant converter 100 according to embodiments of the invention.

FIG. 1 demonstrates LLC resonant converter 100 according to embodiments of the invention, converting input voltage $V_{IN}$ in a primary side into output voltage $V_{OUT}$ in a secondary side. Shown in FIG. 1, LLC resonant converter 100 includes power controller 102, high-side switch HS, low-side switch LS, transformer TF, capacitors CIN, CVCC, CL, and COUT, diodes D1, D2H, and D2L, error amplifier ER, and photo coupler OPT. Inside transformer TF, there are primary winding LP, auxiliary winding LA, secondary windings LSH and LSL, inductively coupled to each other. FIG. 1 also shows that transformer TF includes parasitic inductor LPP, representing the leakage inductance and connected in series with primary winding LP and capacitor CL between connection node N1 and input ground. Parasitic inductor LPP, primary winding LP and capacitor CL form an LLC resonant tank that is driven to resonate and transfer power from the primary side to the secondary side.

Power controller 102 according to embodiments of the invention is a packaged integrated circuit having, but not limited to have, power source pin VCC, feedback pin FB, setting pin BSTS, high-side drive pin HGATE, high-side ground pin HGND, low-side drive pin LGATE, and ground pin GND. Via high-side drive pin HGATE and low-side drive pin LGATE, power controller 102 controls high-side ON time $T_{H\text{-}ON}$ of high-side switch HS and low-side ON time $T_{L\text{-}ON}$ of low-side switch LS respectively, so as to energize or deenergize the LLC resonant tank. When current and voltage resonate within the LLC resonant tank, diodes D2H and D2L rectify the induced current through secondary windings LSH and LSL to build up output voltage $V_{OUT}$ powering load 104. In the meantime, diode D1 rectifies induced current through auxiliary winding LA to build up operating power voltage $V_{CC}$, which substantially supplies power that power controller 102 needs.

Regulation of output voltage $V_{OUT}$ is controlled by the combination of error amplifier ER and photo coupler OPT, sending feedback through feedback pin FB to power controller 102. Feedback voltage $V_{FB}$ at feedback pin FB is generated in response to the comparison between output voltage $V_{OUT}$ and predetermined target voltage $V_{TRGT}$. The purpose of regulation is to stabilize output voltage $V_{OUT}$ at about target voltage $V_{TRGT}$. For instance, when output voltage $V_{OUT}$ exceeds target voltage $V_{TRGT}$, photo coupler OPT pulls down feedback voltage $V_{FB}$ at feedback pin FB, high-side ON time $T_{H\text{-}ON}$ and low-side ON time $T_{L\text{-}ON}$ in the next switching cycle shortens, the power feeding into the LLC resonant tank in the next switching cycle reduces, and the power transferred to the secondary side decreases as a result, so output voltage $V_{OUT}$ tends to go down to approach target voltage $V_{TRGT}$. From another point of view, if output voltage $V_{OUT}$ is about the same as target voltage $V_{TRGT}$, the lighter load 104 the lower feedback voltage $V_{FB}$.

Setting pin BSTS of power controller 102 is electrically connected to an external resistor RST, whose resistance for example is detected by power controller 102 to determine burst voltage $V_{BST}$. Burst voltage $V_{BST}$, according to embodiments of the invention, could determine high-side ON time $T_{H-ON}$ and low-side ON time $T_{L-ON}$ when load 104 is light or non-existent.

Figure 2:
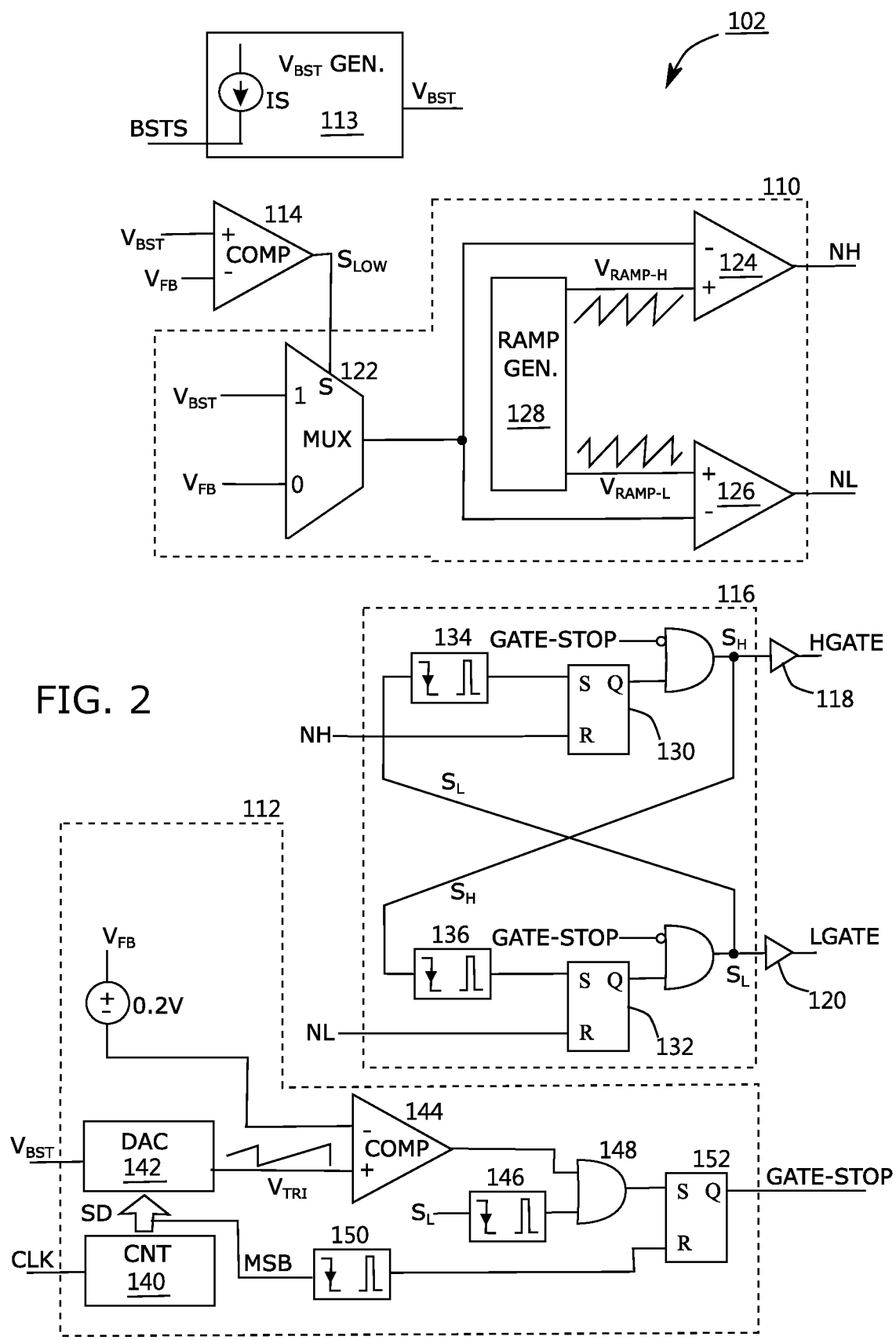
FIG. 2 illustrates power controller 102 in FIG. 1.

FIG. 2 illustrates power controller 102, including ON-time generator 110, burst-mode controller 112, burst-voltage setting circuit 113, comparator 114, logic 116, and gate drivers 118 and 120.

Burst-voltage setting circuit 113 electrically connects to setting pin BSTS, and detects the resistance of external resistor RST to generate burst voltage $V_{BST}$. For example, burst-voltage setting circuit 113 has constant current source IS supplying a constant current flowing through external resistor RST, and burst voltage $V_{BST}$ is, but is not limited to be, the voltage at setting pin BSTS plus 0.2V, which is the minimum value of feedback voltage $V_{FB}$. In one embodiment of the invention, photo coupler OPT can pull down feedback voltage $V_{FB}$ as low as 0.2V at most.

Comparator 114 compares feedback voltage $V_{FB}$ with burst voltage $V_{BST}$. According to embodiments of the invention, when feedback voltage $V_{FB}$ is below burst voltage $V_{BST}$, comparator 114 outputs low-load signal $S_{LOW}$ with logic "1"; in the opposite, when feedback voltage $V_{FB}$ exceeds burst voltage $V_{BST}$, comparator 114 outputs low-load signal $S_{LOW}$ with logic "0". The configuration of comparator 114 and multiplexer 122 is to make multiplexer 122 output the bigger one between feedback voltage $V_{FB}$ and burst voltage $V_{BST}$. Simply speaking, when feedback voltage $V_{FB}$ is below burst voltage $V_{BST}$, multiplexer 122 outputs burst voltage $V_{BST}$, and power controller 102 operates LLC resonant converter 100 in a burst mode, where break time BRK and alternates with work time WK. When feedback voltage $V_{FB}$ exceeds burst voltage $V_{BST}$, multiplexer 122 outputs feedback voltage $V_{FB}$, and power controller 102 operates LLC resonant converter 100 in a non-burst mode, where only work time WK exists and break time BRK disappears.

When operating in a non-burst mode, ON-time generator 110 determines high-side ON time $T_{H-ON}$ of high-side switch HS and low-side ON time $T_{L-ON}$ of low-side switch LS in light of feedback voltage $V_{FB}$. ON-time generator 110 includes multiplexer 122, comparators 124 and 126, and ramp generator 128. Multiplexer 122, in response to the output of comparator 114, forwards feedback voltage $V_{FB}$ to comparators 124 and 126 when operating in a non-burst mode. In the other hand, when operating in a burst mode, multiplexer 122 forwards burst voltage $V_{BST}$ to comparators 124 and 126. For example, ramp generator 128 starts increasing ramp signal $V_{RAMP-H}$ at the same time when high-side switch HS is just turned ON. At the moment when ramp signal $V_{RAMP-H}$ exceeds the signal at the inverted input of comparator 124, which is either feedback voltage $V_{FB}$ or burst voltage $V_{BST}$, depending on the comparison between them, output NH of comparator 124 provides a rising edge, which resets SR flipflop 130 to turn OFF, via gate driver 118, high-side switch HS, so high-side ON time $T_{H-ON}$ is ended. Accordingly, ON-time generator 110 controls the length of high-side ON time $T_{H-ON}$ based on feedback voltage $V_{FB}$ or burst voltage $V_{BST}$. Analogously, ON-time generator 110 controls the length of low-side ON time $T_{L-ON}$ based on feedback voltage $V_{FB}$ or burst voltage $V_{BST}$.

Logic 116 is configured to prevent short through from happening, where short through refers to a short circuit connected between input voltage $V_{IN}$ and input ground when high-side switch HS and low-side switch LS are turned ON at the same time. When signal $S_H$ turns from "1" into "0" for example and gate driver 118 in response starts turning OFF high-side switch HS, the falling edge of signal $S_H$ makes pulse generator 136 generate a pulse to set SR flipflop 132, turning signal $S_L$ from "0" into "1", so gate driver 120 starts turning ON low-side switch LS. Accordingly, low-side switch LS is allowed to turn ON only when high-side switch HS turns OFF. Similarly, high-side switch HS is allowed to be turned ON only when low-side switch LS turns OFF. In other words, logic 116 is capable of making high-side and low-side switches HS and LS switch periodically and complementarily.

Burst-mode controller 112 has counter 140, digital-to-analog converter 142, comparator 144, pulse generators 146 and 150, AND gate 148, and SR flipflop 152. Based on clock CLK counter 140 provides count SD having the most significant bit MSB. The most significant bit MSB is the bit positioned in a binary number having the greatest value.

Clock CLK according to embodiments of the invention could be signal $S_L$ or signal $S_H$, or any signal generated from an independent clock generator. For example, clock CLK could be provided by ramp generator 128, which also generates ramp signals $V_{RAMP-L}$ and $V_{RAMP-H}$ periodically. In one embodiment of the invention, count SD changes and cycles from 0 to 31 every predetermined burst cycle time TBST, which is, but is not limited to be, 1/400 sec. Digital-to-analog converter 142 provides triangular-wave signal $V_{TRI}$ in response to count SD and burst voltage $V_{BST}$, where triangular-wave signal $V_{TRI}$ could be a saw waveform periodically varying from 0V to burst voltage $V_{BST}$ minus 0.2V. The amplitude of triangular-wave signal $V_{TRI}$ is therefore in association with burst voltage $V_{BST}$. For example, the value of triangular-wave signal $V_{TRI}$ could be, according to embodiments of the invention, expressed as $SD*(V_{BST}-0.2)/32$. Comparator 144 compares triangular-wave signal $V_{TRI}$ with feedback voltage $V_{FB}$ minus 0.2V. Supposed that triangular-wave signal $V_{TRI-M}$ is equal to triangular-wave signal $V_{TRI}$ plus 0.2V, comparator 144 equivalently compares triangular-wave signal $V_{TRI-M}$ with feedback voltage $V_{FB}$. At the time when feedback voltage $V_{FB}$ is below triangular-wave signal $V_{TRI-M}$, comparator 144 sets, via AND gate 148, SR flipflop 152, making stop signal GATE-STOP "1" in logic and causing both high-side switch HS and low-side switch LS OFF. Shown in FIG. 2, when feedback voltage $V_{FB}$ minus 0.2V is less than triangular-wave signal $V_{TRI}$, both high-side switch HS and low-side switch LS are constantly OFF; when feedback voltage $V_{FB}$ minus 0.2V is more than triangular-wave signal $V_{TRI}$, high-side and low-side switches HS and LS switch periodically and complementarily.

Pulse generator 146, configured to be triggered by the falling edge of signal $S_L$, provides a short pulse to AND gate 148, to open a window during which stop signal GATE-STOP is allowed to turn from "0" to "1". From an aspect of view, the comparison between triangular-wave signal $V_{TRI}$ and feedback voltage $V_{FB}$ minus 0.2V can be recorded by SR flipflop 152 only during the window after low-side switch LS is turned OFF. Further from another aspect of view, burst-mode controller 112 checks, only during that window after low-side switch LS is turned OFF, whether or not triangular-wave signal $V_{TRI}$ exceeds feedback voltage $V_{FB}$ minus 0.2V. Therefore, during the time when high-side switch HS or low-side switch LS is still ON, high-side switch HS or low-side switch LS will not be suddenly turned OFF by comparator 144 even if triangular-wave signal $V_{TRI}$ exceeds feedback voltage $V_{FB}$ minus 0.2V.

Pulse generator 150, triggered by the falling edge of the most significant bit MSB, provides a short pulse to reset SR flipflop 152, forcing stop signal GATE-STOP to be "0" in logic, so as to let high-side and low-side switches HS and LS switch periodically and complementarily. Therefore, no matter how much feedback voltage $V_{FB}$ is, the falling edge of the most significant bit MSB will cause high-side switch HS and low-side switch LS to turn ON at least once. It can be understood from the configuration of burst-mode controller 112, since the falling edge of the most significant bit MSB appears at least once every predetermined burst cycle time TBST, high-side switch HS and low-side switch LS turn ON at least once every predetermined burst cycle time TBST. According to another embodiment of the invention, it is the rising edge of the most significant bit MSB that triggers pulse generator 150 to provide a short pulse resetting SR flipflop 152.

Figure 3:
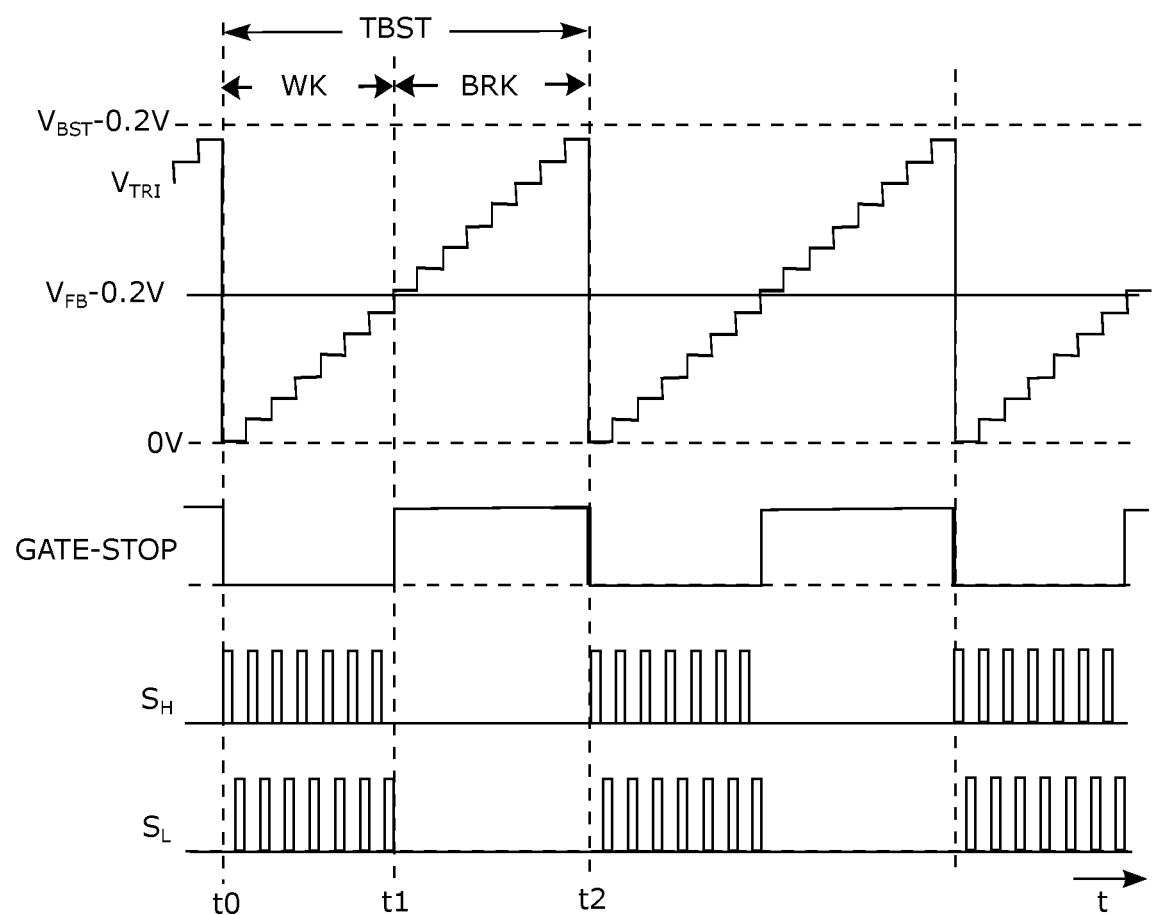
FIG. 3 demonstrates the waveforms of triangular-wave signal $V_{TRI}$, feedback voltage $V_{FB}$ minus 0.2V, stop signal GATE-STOP, signal $S_H$ controlling high-side switch HS, and signal $S_L$ controlling low-side switch LS, when feedback voltage $V_{FB}$ is below burst voltage $V_{BST}$.

FIG. 3 demonstrates the waveforms of triangular-wave signal $V_{TRI}$, feedback voltage $V_{FB}$ minus 0.2V, stop signal GATE-STOP, signal $S_H$ controlling high-side switch HS, and signal $S_L$ controlling low-side switch LS, when feedback voltage $V_{FB}$ is below burst voltage $V_{BST}$.

As shown in FIG. 3, triangular-wave signal $V_{TRI}$ cycles once every predetermined burst cycle time TBST. Every time when the waveform of triangular-wave signal $V_{TRI}$ goes across that of feedback voltage $V_{FB}$ minus 0.2V, stop signal GATE-STOP changes its logic value into "0" or "1". At moment t0, the most significant bi MSB has a falling edge, so high-side and low-side switches HS and LS start switching periodically and complementarily. Moment t0 is also the beginning of a predetermined burst cycle time TBST, as shown in FIG. 3.

Feedback voltage $V_{FB}$ minus 0.2V is higher than triangular-wave signal $V_{TRI}$ during the period from moment t0 to moment t1, so stop signal GATE-STOP is "0", and high-side and low-side switches HS and LS switch periodically and complementarily. Therefore, the period from moment t0 to moment t1 is referred to as work time WK, during which high-side and low-side switches HS and LS are controlled to energize the LLC resonant tank. Both high-side ON time $T_{H-ON}$ and low-side ON time $T_{L-ON}$ during work time WK in FIG. 3 are constant, independent from feedback voltage $V_{FB}$, because multiplexer 122 in ON-time generator 110 is currently providing burst voltage $V_{BST}$ to comparators 124 and 126.

During break time BRK, referring to the period of time from moment t1 to moment t2, feedback voltage $V_{FB}$ minus 0.2V is below triangular-wave signal $V_{TRI}$, so stop signal GATE-STOP is "1" in logic, and high-side and low-side switches HS and LS are constantly OFF. At moment t2, a predetermined burst cycle time TBST ends and a next predetermined burst cycle time TBST starts.

Work duty DWK refers to the ratio of work time WK to predetermined burst cycle time TBST. It is comprehensible from FIG. 3 that, if feedback voltage $V_{FB}$ increases, then both work time WK and work duty DWK increase but the predetermined burst cycle time TBST remains unchanged.

Figure 4A:
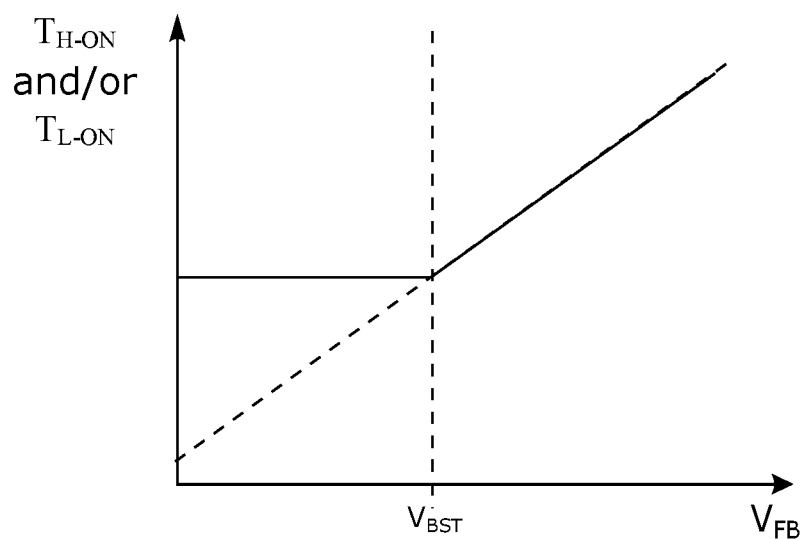
FIG. 4A demonstrates the relationship between feedback voltage $V_{FB}$ and high-side ON time $T_{H\text{-}ON}$ and/or low-side ON time $T_{L\text{-}ON}$.
Figure 4B:
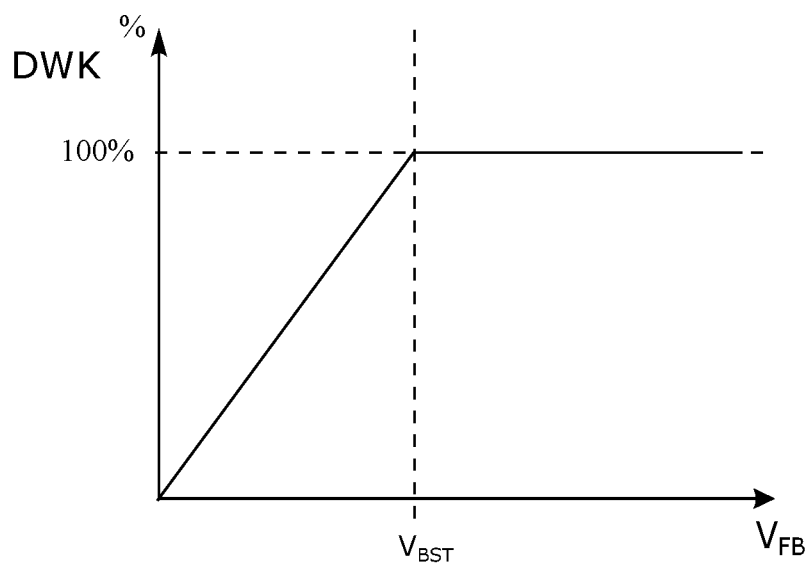
FIG. 4B the relationship between feedback voltage $V_{FB}$ and work duty DWK.

FIG. 4A demonstrates the relationship between feedback voltage $V_{FB}$ and high-side ON time $T_{H-ON}$ and/or low-side ON time $T_{L-ON}$, and FIG. 4B the relationship between feedback voltage $V_{FB}$ and work duty DWK.

FIG. 4A shows that when feedback voltage $V_{FB}$ exceeds burst voltage $V_{BST}$ each of high-side ON time $T_{H-ON}$ and low-side ON time $T_{L-ON}$ is in positive linear correlation with feedback voltage $V_{FB}$. Nevertheless, when feedback voltage $V_{FB}$ drops to be less than burst voltage $V_{BST}$, each of high-side ON time $T_{H-ON}$ and low-side ON time $T_{L-ON}$ depends on feedback voltage $V_{FB}$ no more, and becomes a constant determined by burst voltage $V_{BST}$.

FIG. 4B shows that if feedback voltage $V_{FB}$ exceeds burst voltage $V_{BST}$, work duty DWK is always 100%, meaning that high-side and low-side switches HS and LS switch periodically and complementarily all the time. Nevertheless, if feedback voltage $V_{FB}$ drops to be less than burst voltage $V_{BST}$, work duty DWK becomes less than 100% because of the occurrence of break time BRK, and the less feedback voltage $V_{FB}$ the less work duty DWK.

According to embodiments of the invention, when the load is light or nonexistent, LLC resonant converter 100 is capable of being operated in a burst mode, in which break time BRK alternates with work time WK. The introduction of break time can reduce switching losses of high-side and low-side switches HS and LS, improving power conversion efficiency.

The predetermined burst cycle time TBST could be properly set to avoid uncomfortable audible noise that probably occurs when LLC resonant converter 100 is operated in a burst mode when the load is light.

A system engineer could select external resistor RST to determine the load threshold which determines the quantity of load 104 for LLC resonant converter 100 to operate in a burst mode. External resistor RST also can determine high-side ON time $T_{H-ON}$ and low-side ON time $T_{L-ON}$, which are two constants when LLC resonant converter 100 operates in a burst mode.

According to embodiments of the invention, each of high-side switch HS and low-side switch LS is turned ON at least once every predetermined burst cycle time TBST, which is internally set by burst-mode controller 112 and consists of one break time BRK and one work time WK. Without making each of high-side switch HS and low-side switch LS turned ON at least once every predetermined burst cycle time TBST, break time BRK might last so long that the real predetermined burst cycle time TBST could be an integer multiple of the predetermined burst cycle time TBST internally set by burst-mode controller 112. It might induce uncomfortable audible noise if the real predetermined burst cycle time TBST is too long.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A power controller for controlling a high-side switch and a low-side switch, comprising:
   an ON-time generator, controlling a high-side ON time of the high-side switch and a low-side ON time of the low-side switch in response to a feedback voltage, wherein the feedback voltage is generated in response to an output voltage of a power converter;
   a burst-mode controller, comprising:
     a triangular-wave generator, providing a triangular-wave signal with a predetermined burst cycle time, wherein an amplitude of the triangular-wave signal is in association with a burst voltage; and a first comparator comparing the triangular-wave signal and the feedback voltage, wherein the first comparator causes the high-side switch and the low-side switch to be constantly turned OFF when the feedback voltage is below the triangular-wave signal; and a second comparator for comparing the burst voltage and the feedback voltage, configured to cause the low-side and the high-side ON times controlled in response to the burst voltage when the feedback voltage is below the burst voltage.

2. The power controller as claimed in claim 1, wherein the triangular-wave signal varies between a predetermined voltage and the burst voltage.

3. The power controller as claimed in claim 2, wherein the triangular-wave generator comprises:
a counter providing a count in response to a clock; and
a digital-to-analog converter for generating the triangular-wave signal in response to the count and the burst voltage.

4. The power controller as claimed in claim 3, wherein the count has a most significant bit (MSB) and the burst-mode controller is configured to make the high-side and low-side switches turned ON in response to a change of the MSB.

5. The power controller as claimed in claim 1, wherein the burst-mode controller is configured to make the high-side and low-side switches turned ON at least once every predetermined burst cycle time.

6. The power controller as claimed in claim 1, wherein the power controller includes a setting circuit connected to a resistor to generate the burst voltage.

7. The power controller as claimed in claim 6, wherein the power controller is in a form of a packaged integrated circuit with a setting pin, and the resistor is connected to the setting circuit via the setting pin.

8. A control method for an LLC resonant converter with high-side and low-side switches, the control method comprising:
providing a feedback voltage in response to an output voltage of the LLC resonant converter;
providing a burst voltage;
generating a triangular-wave signal with a predetermined burst cycle time based on the burst voltage;
comparing the triangular-wave signal with the feedback voltage;
turning OFF the high-side and low-side switches if the feedback voltage is below the triangular-wave signal; and
controlling a high-side ON time of the high-side switch and a low-side ON time of the low-side switch in response to whichever voltage is larger between the burst voltage and the feedback voltage.

9. The control method as claimed in claim 8, wherein the triangular-wave signal varies between a predetermined voltage and the burst voltage.

10. The control method as claimed in claim 8, wherein the LLC resonant converter has a power controller and a resistor, and the control method used by the power controller comprises:
providing the burst voltage in response to the resistor.

11. The control method as claimed in claim 8, comprising:
turning ON the high-side switch and the low-side switch at least once every predetermined burst cycle time.

12. The control method as claimed in claim 8, comprising:
providing a count in response to a clock; and
generating the triangular-wave signal in response to the count and the burst voltage.

13. The control method as claimed in claim 12, wherein the count has a most significant bit, and the control method comprises:
turning ON the high-side switch and the low-side switch at least once after the most significant bit changes.

14. An LLC resonant converter, comprising:
a high-side switch and a low-side switch electrically connected to each other via a connection node and between two power lines;
a resonant tank electrically connected to the connection node;
a secondary winding inductively coupled to the resonant tank to generate an output voltage; and
a power controller for controlling the high-side switch and the low-side switch, wherein the power controller is configured to perform the following steps comprising:
providing a feedback voltage in response to the output voltage;
controlling a high-side ON time of the high-side switch and a low-side ON time of the low-side switch in response to whichever is larger between a burst voltage and the feedback voltage;
generating a triangular-wave signal with a predetermined burst cycle time based on the burst voltage; and
determining, in response to a comparison between the triangular-wave signal and the feedback voltage, a break time when the high-side switch and the low-side switch are constantly turned OFF.

15. The LLC resonant converter as claimed in claim 14, wherein the power controller comprises:
a burst-mode controller, comprising:
a triangular-wave generator providing the triangular-wave signal with an amplitude in association with the burst voltage; and
a first comparator comparing the triangular-wave signal and the feedback voltage, wherein the first comparator causes the high-side switch and the low-side switch to be constantly turned OFF to start the break time when the feedback voltage is below the triangular-wave signal.

16. The LLC resonant converter as claimed in claim 14, wherein the power controller comprises:
an ON-time generator, controlling the high-side ON time and the low-side ON time in response to a feedback voltage; and
a comparator for comparing the burst voltage and the feedback voltage, configured to affect the ON-time generator and cause the low-side and the high-side ON times controlled in response to the burst voltage when the feedback voltage is below the burst voltage.

17. The LLC resonant converter as claimed in claim 14, wherein the power controller turns ON the high-side switch and the low-side switch at least once every predetermined burst cycle time.

18. The LLC resonant converter as claimed in claim 17, wherein the power controller comprises:
a counter providing a count in response to a clock; and
a digital-to-analog converter for generating the triangular-wave signal in response to the count and the burst voltage.

19. The LLC resonant converter as claimed in claim 18, wherein the count has a most significant bit (MSB) and the power controller is configured to make the high-side and low-side switches turned ON in response to a change of the MSB.

20. The LLC resonant converter as claimed in claim 14, further comprising a resistor electrically connected to the power controller, and the power controller generate the burst voltage in response to the resistance of the resistor.

\* \* \* \* \*